(12) United States Patent
Kindberg et al.

(10) Patent No.: US 8,204,936 B2
(45) Date of Patent: Jun. 19, 2012

(54) DATA COMMUNICATION

(75) Inventors: Timothy Kindberg, Bristol (GB);
Kenton O'Hara, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 123 days.

(21) Appl. No.: 12/422,264

(22) Filed: Apr. 11, 2009

(65) Prior Publication Data
US 2009/0259719 A1 Oct. 15, 2009

(30) Foreign Application Priority Data

Apr. 11, 2008 (GB) .................................. 0806675.5

(51) Int. Cl.
*G06F 15/16* (2006.01)

(52) U.S. Cl. ....... 709/204; 709/203; 455/557; 455/41.2; 725/24

(58) Field of Classification Search .................. 709/203, 709/204; 455/557; 725/24
See application file for complete search history.

(56) References Cited

U.S. PATENT DOCUMENTS

| 2003/0204438 | A1 | 10/2003 | Connelly et al. |
| 2004/0193676 | A1* | 9/2004 | Marks ........................... 709/203 |
| 2006/0276133 | A1* | 12/2006 | Ly et al. ........................ 455/41.2 |
| 2008/0098417 | A1* | 4/2008 | Hatamian et al. ............... 725/24 |
| 2008/0125172 | A1* | 5/2008 | Leon et al. ..................... 455/557 |

OTHER PUBLICATIONS

United Kingdom (UK) search report in corresponding UK patent application GB0806675.5, dated Aug. 11, 2008.
K. O'Hara et al., "Jukola: Democratic Music Choice in a Public Space," Proceedings of DIS2004, Aug. 1-4, 2004, Cambridge, Mass., USA, pp. 145-154.

* cited by examiner

*Primary Examiner* — Kyung H Shin

(57) ABSTRACT

A computer voting system arranged to receive votes from one or more mobile communications devices through a wireless personal area network in order to select content stored on the system, each mobile device comprising a mobile device name that can be edited by a user to include a user-entered vote, the system comprising: inputs arranged to receive one or more mobile device names; a processor arranged to analyse the or each device name to determine the presence of user-entered votes; storage apparatus arranged to store content; and an output arrangement arranged to output content; wherein the processor is further arranged to determine the content to be output by the output arrangement based on the or each user-entered vote.

14 Claims, 4 Drawing Sheets

DATA COMMUNICATION

RELATED APPLICATIONS

The present patent application claims priority under 35 USC 119 to the previously filed and copending patent application filed in the United Kingdom (UK or GB) on Apr. 11, 2008, assigned UK patent application number 0806675.5, and entitled "Data Communication."

FIELD OF THE INVENTION

The present invention relates to data communication. In particular, but not exclusively, the invention relates to a system arranged to receive instructions from one or more mobile communications devices through a wireless personal area network, and a method for sending instructions from a mobile telecommunications device to a computer system by way of a wireless personal area network.

BACKGROUND TO THE INVENTION

Systems for delivering media content to a group of people in a public or shared space are commonplace. For example, video display screens in public areas may be used to show news clips, advertisements and so on. Similarly, music is often played in public spaces such as cafes, restaurants and bars, as well as in retail spaces, leisure centres and similar environments. In all of these cases, the objective is to provide information or entertainment to the individuals within the audience group. Often, a computer-controlled system is employed to store, retrieve and deliver the media content to a suitable output device.

In many cases, the selection of content to be delivered is determined solely by an operator of the system. For example, the content displayed on a public video screen may be pre-selected by an operator. Similarly, the music played in a bar may be chosen by the staff, who operate the music-playing system.

In such cases, it is often an aim of the person responsible for selecting the content to choose content which matches, or reflects, the preferences of the largest possible number of individuals within the audience group. For example, a person responsible for the selection of video advertisements to be displayed on a public video screen might seek to select those advertisements he or she expects to appeal to a majority of the audience group in the vicinity of the screen at the relevant time.

Similarly, a person responsible for the selection of music to be played in a bar may have the musical tastes of the bar's customers in mind.

In practice, the individuals within the audience group may have different preferences to one another, and those preferences might span a broad range of tastes. The selection of media content that appeals to everyone in the audience group is therefore difficult. Furthermore, individuals may enter and leave the audience group over time, and consequently the distribution of preferences may be constantly changing.

So, when a staff member chooses the music played to the audience group, he or she will choose according to either his or her own tastes, or will choose music which, in their opinion, is most likely to be acceptable to the majority of the audience group present at that time.

Such an arrangement has a number of disadvantages. The audience group as a whole has no direct control or influence over the media delivery system. In some situations, such as in a bar or restaurant, individuals within the audience group may seek to influence the content selection by expressing their preferences to the person responsible for making the selection. In other situations, such as the display of video in a public space, such interaction might not be possible.

Either way, the absence of a means of effectively influencing or expressing a preference as to the media content delivered increases the risk that those members of the audience group who are dissatisfied with the selection will divert their attention away from the media content or even leave the space. Consequently, the task of selecting appropriate media for engaging the attention of, or entertaining, a changing audience group can become burdensome for the responsible person.

A number of existing systems allow members of an audience group to select or influence the media content delivered to them, thus addressing the above problem.

For example, a jukebox allows an individual to select one or more music tracks to be played from a number of available tracks. Usually, a charge is made for each track selected. Although some degree of control is possible by limiting the available tracks to a pre-selected set, the whole audience group is subjected to the choice of one individual. Thus, the preferences of the majority of the audience group are, largely, not taken into account. Jukeboxes are often considered to be unsuitable for many environments for that reason.

Other systems have been developed which are designed to take account of the preferences of a majority of, rather than an individual member of, an audience group.

In one such system, data representing the preferences of individual users of a public space is stored on a central database. Users register their entry into the space by way of an identity card and reader arrangement. The pre-stored preference data for the current users of the space, i.e. the current audience group, can be retrieved and input to a suitable algorithm which outputs a selection of media content which is, as far as is possible, aligned with the preferences of the audience group.

While this system is capable of taking account of the preferences of all of the users of the space, it requires each user to explicitly register their preferences in advance for storage on the database. Furthermore, users must register their presence in the space in order for their preferences to be taken into account, and registration itself requires relatively complex and expensive hardware in the form of identity cards. It is therefore not suitable for use in spaces which do not have a regular group of users.

In another system ("Jukola: democratic music choice in a public space": Symposium on Designing Interactive Systems, Proceedings of the 5th conference on Designing interactive systems: processes, practices, methods, and techniques, Cambridge, Mass., USA Pages: 145-154, 2004), members of the audience group are provided with voting devices. The voting devices display a small number of options for media content to be delivered. For example, when used in a bar or similar environment, the voting devices may display a small number of music tracks to be played next. Individuals within the audience group indicate their preference for the media content to be delivered by selecting one of the options, and the voting devices send the selection information to a central computer. The central computer processes the selection information to determine the most popular option, and the appropriate media content is then scheduled for delivery.

Again, this system requires a complex and expensive hardware set-up including, in some circumstances, a large number of voting devices.

It is against this background that the present invention has been devised.

SUMMARY OF THE INVENTION

In one embodiment of the present invention, a computer system is arranged to receive instructions from one or more mobile communications devices through a wireless personal area network (WPAN). Each mobile device comprises a mobile device name that can be edited by a user to include a user-entered instruction. The system comprises input means arranged to receive one or more mobile device names, and processing means arranged to analyse the or each device name to determine the presence of user-entered instructions, wherein the processing means is further arranged to execute the or each user-entered instruction.

The system may comprise storage means arranged to store content, and may further comprise output means arranged to output content based on the or each executed user-entered instruction. In one embodiment, for example, the output means comprises a media player arranged to output content.

The or each user-entered instruction may relate to selection of stored content for output by the output means. For example, the user-entered instructions may refer to the name or other identifier of a particular part of the stored content.

Not all of the mobile device names in the first plurality need contain user-entered instructions. Accordingly, the system may be arranged to receive a first plurality of mobile device names, and the processor may be arranged to determine a second plurality of user-entered instructions within the first plurality of mobile device names and to select content based on the determined user-entered instructions.

The system may be arranged to receive the mobile device names over a defined time period. In such a case, the processor may be arranged to select content based on the user-entered instruction determined from the device name received first within the time period. In this way, the first user who supplies an instruction to the system via a mobile device within the time period effectively chooses the selected content. Alternatively, the processor may be arranged to select content based on all of the user-entered instructions determined from the device names received within the time period. In this case, instructions from all of the users are taken into account in selecting the content.

In one embodiment, the system is arranged to display information relating to a set of content stored on the storage means, such that the user-entered instructions relate to selection of one of the set. In particular, the content may comprise music files, and the computer system may comprise a voting system for the music files. In this case, the user-entered instructions relate to a vote for one of the music files, for example within a set for which information is displayed. In this way, the computer system can function as an interactive jukebox in which many users can express, by sending instructions to the system, a preference for which music track should be played by the jukebox.

The system may further comprise acknowledgement means arranged to send, via the wireless personal area network, an acknowledgement to the or each mobile device from which a user-entered instruction has been received. This confirms to the user that their instruction has been received by the system and indicates to the user that they can, if desired, edit the mobile device name to remove the instruction.

In one embodiment of the invention, the input means is also arranged to receive one or more unique mobile device addresses to uniquely identify the or each mobile device in the WPAN. By uniquely identifying the or each mobile device, duplicated execution of user-entered instructions can be avoided. For example, the processor may be arranged to execute a limited number of user-entered instructions from the or each mobile device in a given time period.

Conveniently, the WPAN is a Bluetooth (registered trade mark) network, in which case, the input means may be arranged to receive one or more mobile device names and, optionally, one or more unique mobile device addresses from one or more Bluetooth transceivers.

Mobile devices with built-in WPAN capabilities are increasingly commonplace, and many cellular telephones are equipped with Bluetooth transceivers for radio-frequency WPAN communication. The Bluetooth system allows communication between devices equipped with Bluetooth transceivers over a range of approximately 10 to 100 m.

The Bluetooth communications standard provides for device addresses, sometimes designated BD_ADDR, and 'user-friendly' device names. The device address associated with a Bluetooth transceiver is factory-set, and uniquely identifies the transceiver. In other words, no two Bluetooth transceivers should, in principle, share a common device address. In some embodiments of present invention, therefore, the or each unique mobile device address is a Bluetooth device address.

The device name associated with a Bluetooth transceiver is user-editable, and consists of a character string encoded in UTF-8 with a maximum length of 248 bytes. Accordingly, in some embodiments of the invention, the mobile device name is a Bluetooth device name.

Advantageously, therefore, the mobile devices used to send instructions to systems embodying the present invention may be Bluetooth-enabled devices such as mobile telephones, personal digital assistants, laptop computers and so on. It is anticipated that most individuals within a group of individuals that forms an audience for receiving content will possess one or more such Bluetooth-enabled devices.

It is to be noted that a Bluetooth-equipped mobile device requires no additional software or hardware to send instructions to a system embodying the invention. Consequently, it is not necessary for an operator of the instruction-receiving system to provide dedicated mobile devices for use by the audience group, or to supply suitable software. Instead, any member of the public with a Bluetooth-equipped device can participate in the sending of instructions.

In another embodiment of the present invention, there is provided a method for sending instructions from a mobile telecommunications device to a computer system by way of a wireless personal area network. The method comprises enabling the mobile device for connection to the wireless personal area network, and inserting an instruction in a device name of the mobile device.

In a further embodiment of the present invention, there is provided a computer voting system arranged to receive votes from one or more mobile communications devices through a wireless personal area network in order to select content stored on the system, each mobile device comprising a mobile device name that can be edited by a user to include a user-entered vote, the system comprising: input means arranged to receive one or more mobile device names; processing means arranged to analyse the or each device name to determine the presence of user-entered votes; storage means arranged to store content; and output means arranged to output content; wherein the processing means is further arranged to determine the content to be output by the output means based on the or each user-entered vote.

In a yet further embodiment of the present invention, there is provided a method for sending votes from a mobile telecommunications device to a computer system by way of a wireless personal area network, the method comprising:

enabling the mobile device for connection to the wireless personal area network; and inserting a vote in a device name of the mobile device.

It is noted that the preferred/optional features of the first embodiment of the invention described above may be applicable to the other embodiments of the invention described above.

DESCRIPTION OF THE DRAWINGS

Preferred embodiments of present invention will now be described, by way of example only, with reference to the accompanying drawings in which.

DETAILED DESCRIPTION OF PREFERRED EMBODIMENTS OF THE INVENTION

Figure 1:
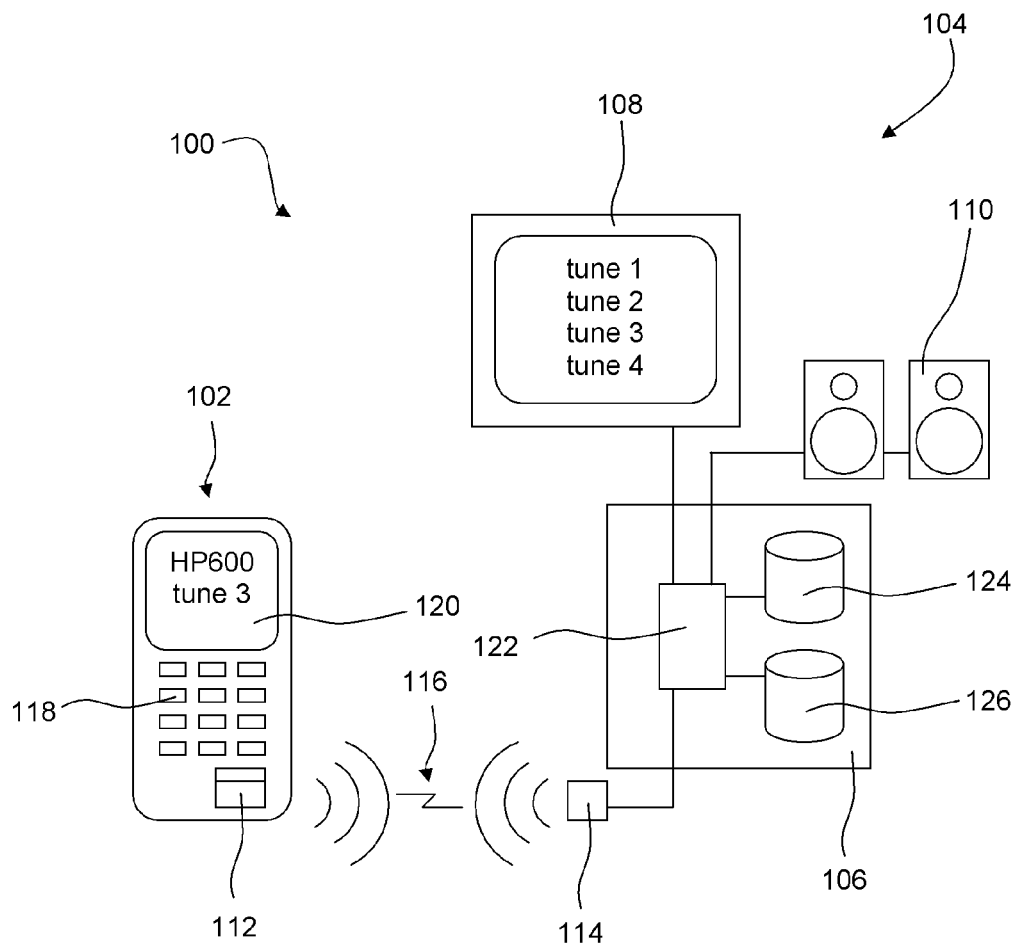
FIG. 1 shows a mobile device communicating with a computer system in accordance with one embodiment of the invention.

In a first embodiment, the invention resides in a system and method for sending or submitting instructions to a computer system. In one example, shown in FIG. 1, the system includes a mobile communications device 102 such as a mobile telephone or cellular phone, and a computer system 104 arranged to receive instructions from the mobile device through a wireless personal area network (WPAN). The computer system includes a controller 106 and output means, in this case a media player having display apparatus 108 and a loudspeaker system 110.

The mobile device 102 includes a combined (WPAN) transmitter and receiver device 112, or transceiver, and the computer system includes input means comprising a compatible WPAN transceiver 114. In this way, the mobile device 102 can communicate with the computer system 104 via a wireless data link 116. The mobile device 102 is operable via input means, such as a touch-sensitive screen or a keypad 118, and includes a textual or graphical display 120.

The controller 106 of the computer system 104 includes a processor 122, data storage means for storing content in electronic form, hereafter referred to as a media store 124, and data storage apparatus for storing communications information, hereafter referred to as an address store 126.

The system of FIG. 1 is arranged as a music voting system for use in a bar or similar space. The display apparatus 108 consists of one or more video screens visible to users of the space, and the loudspeaker system 110 is arranged so that output from the loudspeaker system 110 is audible to users of the space.

Media files, such as music tracks or music videos are stored in electronic form in the media store 124, for example in MPEG format. Each media file is associated with metadata including, for example, the name of the artist, the title of the track, and the genre of the music.

The computer system 104 is arranged to play selected media files to the users of the space. In other words, the processor 122 is arranged to retrieve a selected media file from the media store 124, and then to convert audio content within the media file to an output signal for output to the loudspeaker system 110. The processor 122 may also convert the media file to a video signal for output to the display apparatus 108. The video output may, for example, be a music video contained in the media file, text containing information about the media file being played, or a combination of a music video and text.

In addition, the processor 122 is capable of retrieving metadata from media files not currently being played, and including in the video signal text relating to the metadata.

In the FIG. 1 example, communication between the mobile device 102 and the computer system 104 is achieved by way of a WPAN based on a short-range, radio-frequency communications standard such as a Bluetooth.

The WPAN transceiver 112 in the mobile device 102 transmits, on request, a device address which is unique to that transceiver, along with a user-input device name (often known in the art as a 'friendly' name).

Under normal circumstances, the device address cannot be edited by the user of the mobile device 102, whereas the mobile device name can be edited by a user to include a user-entered instruction.

One possible mode of operation of the system will now be described, referring additionally to FIG. 2 which describes the overall procedure used to select, during successive rounds of voting, a track to be played by the computer system 104.

Figure 2:
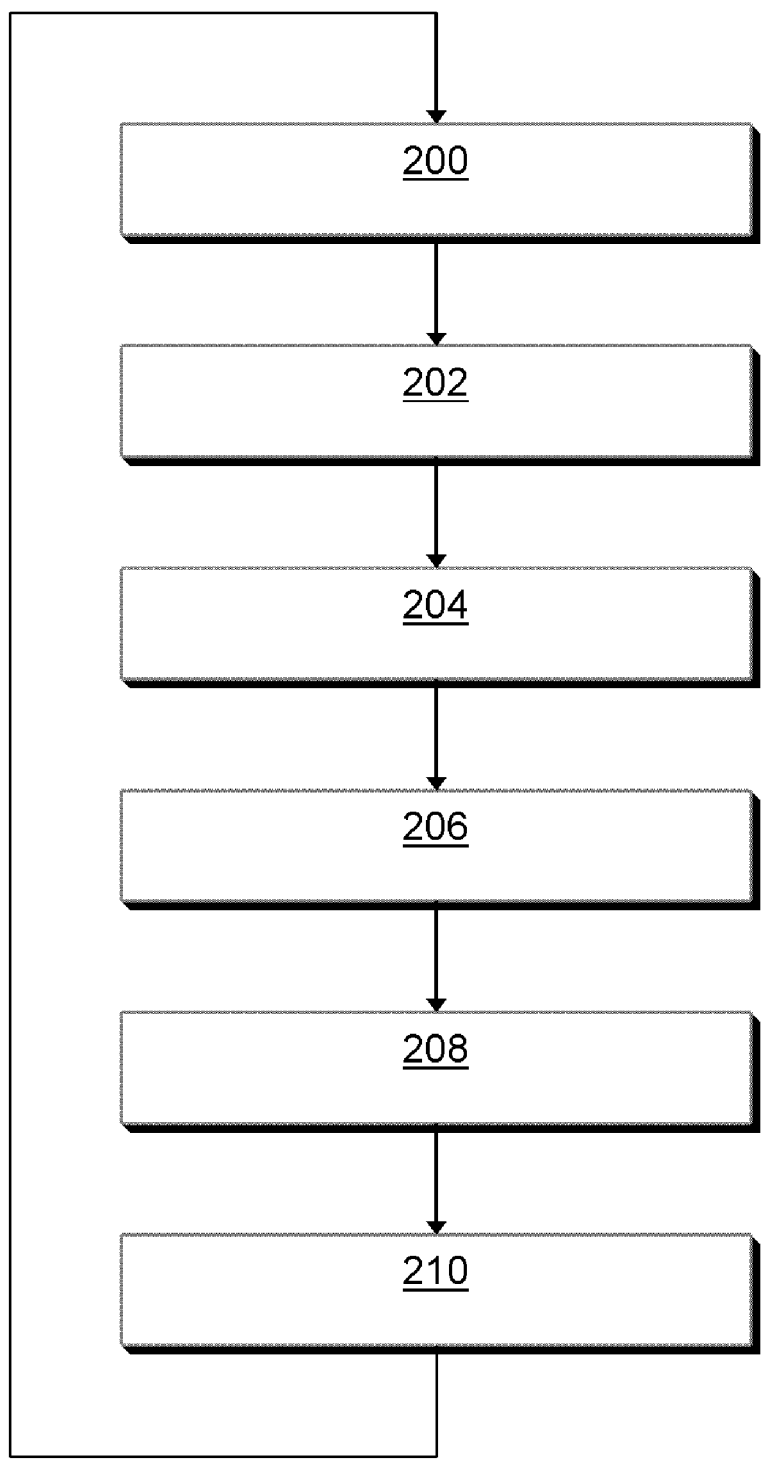
FIG. 2 is a flow chart showing a procedure for voting for music, in which an embodiment of the present invention can be used.

In summary, at step 200 in FIG. 2, a voting round begins when a new shortlist of tracks is created. At step 202, the names of tracks in the shortlist are displayed on the display apparatus 108. At step 204, users input voting instructions to their mobile devices. At step 206, the computer system 104 retrieves the voting instructions from the mobile devices 102. Then, at step 208, the processor 122 determines the winning track using the voting instructions. Finally, at step 210, the winning track is scheduled for play and the voting round ends. The process then returns to step 200 to begin the next voting round. The procedure shown in FIG. 2 will now be explained in more detail.

First, at the start of a voting round, a small number of the stored media tracks are selected by the processor 122, so as to create a 'shortlist' (step 200 in FIG. 2). The tracks in the shortlist may be selected randomly by the processor 122, selected manually via a user interface (not shown) of the computer system 104, or selected by other manual, automatic, or user-influenced means.

Information about the tracks in the shortlist, for example the names of the tracks and the artists, is extracted from the stored metadata by the processor 122. At step 202 in FIG. 2, this information is displayed on the display apparatus 108, as shown schematically in FIG. 1. Preferably, the information for each track is associated with an identifier, such as 'A', 'B', 'C' and so on or, as shown in FIG. 1, 'tune 1', 'tune 2', 'tune 3' and so on.

At step 204 in FIG. 2, users of the space then have the opportunity to indicate a preference for one of the displayed, shortlisted tracks by sending voting instructions to the computer system 104 in the following way. The method of sending voting instructions is shown, from the user's perspective, in FIG. 3 as a flowchart and in FIG. 4 which shows a simplified example of the text displayed on the mobile device 102 as the method is performed.

Figure 3:
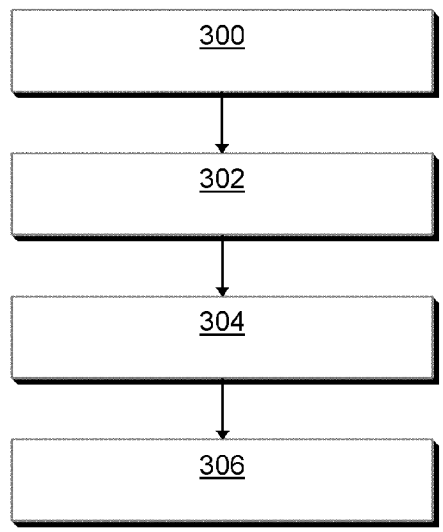
FIG. 3 is a flow chart showing steps in a method according to an embodiment of the invention for submitting instructions from a mobile device to a computer system.
Figure 4:
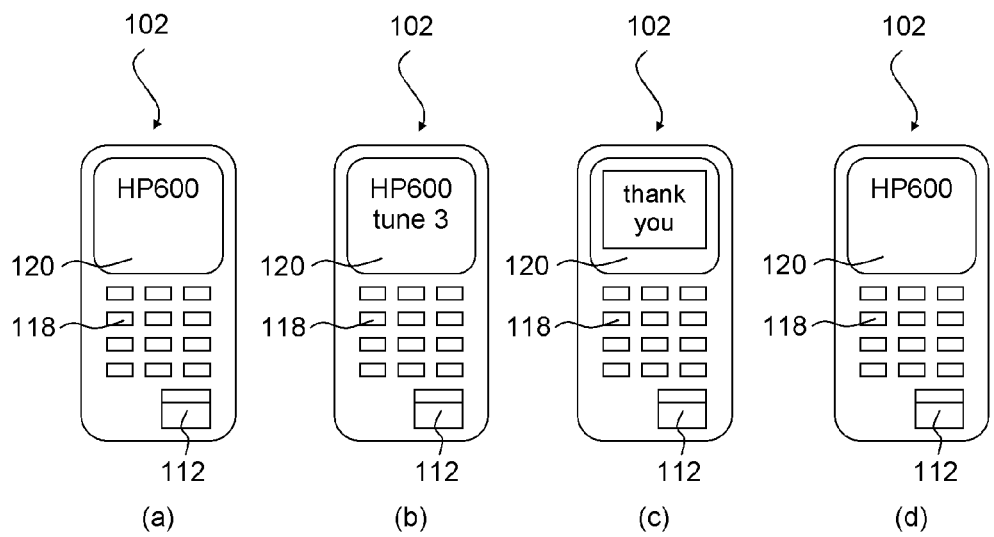
FIG. 4 shows a mobile device being used in accordance with the method of FIG. 3.

If necessary, at step 300 in FIG. 3, the user first enables or activates the WPAN transceiver 112 on their mobile device 102, and sets the device 102 to be 'discoverable'. In other words, the mobile device 102 is configured to respond to requests for device information received via the WPAN transceiver 112. In the Bluetooth standard, a device set to be discoverable listens for inquiries on a dedicated inquiry scan physical channel and will respond to inquiries on that channel by transmitting information including the device name and address.

At step 302 in FIG. 3, the user modifies the friendly name of the device to include the voting instruction. As shown in the display 120 of the mobile device 102 in FIG. 4(a), the friendly name of the mobile device 102 initially corresponds to, for example, the model designation of the mobile device 102. The user modifies the friendly name, using the keypad 118, by adding the identifier which corresponds to their preferred track on the shortlist to the end of the friendly name as shown in FIG. 4(b).

It will be appreciated that the steps of activating the WPAN transceiver of the mobile device (step 300 in FIG. 3) and modifying the friendly name to include the instruction (step 302) could be carried out in reverse order to that shown in FIG. 3.

As will be explained in more detail below, the computer system retrieves the instruction from the mobile device via the WPAN (step 206 in FIG. 2). At step 304 in FIG. 3, the mobile device then receives and displays an acknowledgement message 400 from the computer system 104, as shown in FIG. 4(c). In this way, the user becomes aware that their indicated preference has been recorded by the computer system 104. The user may then, at step 306 in FIG. 3, modify the friendly name of the mobile device 102 so as to remove the instruction and return the friendly name to its original state as shown in FIG. 4(d).

From the user's perspective, the voting process is now complete. The user can then await the next voting round, in which the next batch of shortlisted tracks appears on the display apparatus and the user once again has the opportunity to express their preference for one of the tracks by repeating the above method.

The method by which voting instructions are retrieved from the mobile devices in step 206 of FIG. 2 will now be described with reference to FIG. 5.

Figure 5:
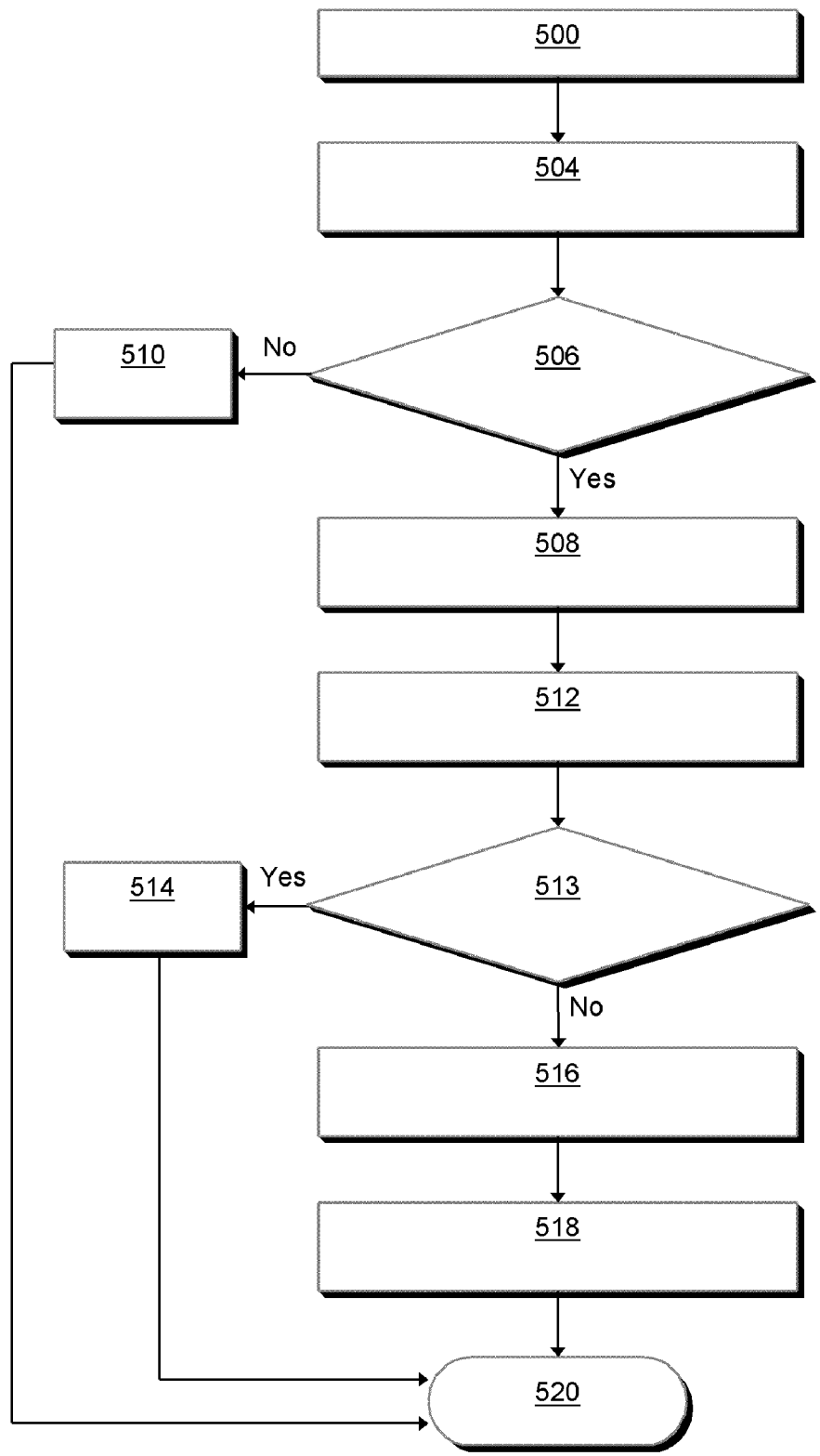
FIG. 5 is a flow chart showing steps in a method according to an embodiment of the invention for obtaining instructions from a mobile device.

In brief, to retrieve voting instructions, the controller 106 starts a discovery process at step 500 in FIG. 5. At step 504, each mobile device 102 transmits its device name and device address to the controller 106. At step 506, the device name is analysed to check for an instruction. If the device name does not contain an instruction, at step 510 the device 102 is ignored and the procedure terminates (step 520) as far as that device is concerned. If the device name does contain an instruction, then at step 508 the controller 106 extracts the instruction from the device name and, at step 512, the controller 106 checks the device address against stored device addresses.

At step 513, the question of whether the device address is already stored is determined. If so, at step 514 the instruction associated with the device address is ignored and the procedure terminates (step 520) as far as that device is concerned. If the device address is not already stored, at step 516 the controller stores the new device address and submits the associated instruction for action. At step 518, the controller sends an acknowledgement to the mobile device 102 via the WPAN. The procedure then terminates at step 520.

The procedure for retrieving voting instructions will now be described in more detail.

When it is necessary to obtain the voting instructions, the controller 106 starts a discovery process via the WPAN transceiver 114 of the computer system 104 (step 500 in FIG. 5). In this example, the discovery process comprises sending inquiries on an inquiry scan channel as described above. Devices within range of the computer system's WPAN transceiver respond by transmitting their device address and friendly device name to the computer system 104 across the WPAN (step 504 in FIG. 5).

In this way, the controller 106 obtains the device addresses and corresponding friendly names from the mobile devices 102 within range of the computer system's transceiver 114.

Then, at step 506 in FIG. 5, the processor 122 parses each friendly name to determine whether a recognised identifier, and hence an instruction, is present in the name. In this way, the processor 122 is arranged to analyse the or each device name to determine the presence of user-entered instructions. If an identifier is found, the identifier is extracted from the friendly name (step 508 in FIG. 5) for execution. So, in the example shown in FIGS. 1 to 5, the controller would recognise 'tune 3' as an identifier in the friendly name and extract that identifier as an instruction associated, by way of the device name, with a particular mobile device. Those devices whose friendly names do not contain a recognised identifier are ignored (step 510 in FIG. 5).

As will be explained in more detail below, the address store 126 of the controller 106 contains a list of device addresses of mobile devices 102 that have already participated in the current voting round. In step 512 of FIG. 5, the device address received from the mobile device 102 is checked against the list of device addresses in the address store 126.

If a matching device address is found in the address store, the instruction associated with that device address is subsequently ignored (step 514 in FIG. 5). By virtue of this checking process, only one vote can be cast on a given mobile device 102 in any one voting round, thus preventing duplication of votes.

If a matching device address is not found in the address store, the device address is added to the list of device addresses in the device store, and the associated instruction is submitted to a voting module of the controller (step 516 in FIG. 5).

The controller issues an acknowledgement to the mobile device, for example by acknowledgement means such as an object push in the vMessage or vNote content format of the Bluetooth specification (step 518 in FIG. 5). As explained above, this completes the voting procedure from the user's perspective.

Referring once again to FIG. 2, at the end of the voting round, a voting module of the controller selects a 'winning' track from the shortlist, taking into account the preferences indicated by the users of the space by evaluating the retrieved voting instructions from the mobile devices (step 208 in FIG. 2). In FIG. 1, the voting module is incorporated within the processor 122.

The specific method used by the voting module to determine the winning track will depend on the application and requirements of the system. For example, it may be desirable to select the track which has received the most votes in that voting round, in which case the voting instructions are evaluated simply by counting, for each track on the shortlist, the number of instructions which consist of the identifier associated with that track. Alternatively, other factors may be taken into consideration, such as the time since that track was last played, the popularity of the track in previous voting rounds, and so on.

The voting module may be connected to a storage apparatus, known as a vote store, for storing the voting instructions received from the mobile devices, so as to allow evaluation of the votes at the end of a voting round. In FIG. 1, the vote store is included within the address store 126. Once a winning track has been selected, the vote store is cleared. Incoming votes may instead, or in addition, be evaluated as they are received, and the voting module may provide an output signal to the display apparatus 108 to display, for each track, the current percentage of the total votes received.

Once the winning track has been determined, that track is scheduled for play (step 210 in FIG. 2) and will, in due course, be retrieved by the processor 122 from the media store 124, converted, and output to the loudspeaker system 110.

The next round of voting begins with the creation of a new shortlist of tracks in step 200 of FIG. 2, as described above.

It will be appreciated that a number of variations, modifications, and additional features could be incorporated in the system and method of the present invention.

A registration system may be provided, wherein instructions are only accepted by the computer system from pre-registered mobile devices. Registration of a device could be achieved by, for example, adding a registration code to the device name. Upon obtaining a device name including a registration code, the computer system would then store the associated device address in a list of registered device addresses. Subsequently, incoming instructions would be accepted only if the device address associated with the instruction appears on the list of registered device addresses.

When embodied as a voting system, the checking process described above to ensure that only one vote per device is counted in each voting round need not be provided, or may be modified. For example, it may be desirable to allow users to change their vote during the course of a voting round. In that case, the received instruction may be stored in the address store in addition to, and associated with, the device address. Then, if a subsequent instruction is received from the same device (i.e. with the same device address), then the stored instruction is overwritten with the subsequent instruction. At the end of the voting round, the stored instructions, which represent the most recent instructions of the users, are retrieved and evaluated.

The computer system used to receive and implement the instructions may be adapted to suit a given application. For example, the computer system may include more than one Bluetooth transceiver, and the transceivers may be distributed throughout an environment so that connections can be made to mobile devices in substantially any part of the space.

It is expected that instructions will be obtained from a plurality of mobile devices in each voting round. In the Bluetooth standard, the discovery process allows the discovery of several devices in one operation and therefore a plurality of device names and addresses can be readily obtained. The computer system may be arranged to process the device names sequentially or in parallel.

Although only one transceiver is shown in FIG. 1, it is conceivable that the computer system could receive instructions from a plurality of Bluetooth transceivers. In this case, device discovery and the sending of acknowledgement messages could be performed in parallel on all transceivers, or sequentially across the transceivers. It will be appreciated that a plurality of Bluetooth transceivers could be provided to extend one or more of the range, speed and accuracy of the discovery process, compared to a single Bluetooth transceiver.

If no acknowledgement message is required, it will be understood that the instructions can be delivered during the discovery process alone, and no further data need be passed between the mobile device and the computer system.

The present invention need not be embodied as a voting system for music. Many other applications of the invention can be contemplated. For example, the invention may be used to control computer-controlled environmental variables, such as lighting, temperature and so on. Taking a temperature-control system in an enclosed public space as an example, the system could take into account the preferences of the occupants of the space by evaluating instructions such as 'too hot' or 'too cold'. In another embodiment, the system could be set up to respond only to instructions from one or more pre-registered devices.

Generally, therefore, in one embodiment the present invention provides a system and method for sending instructions to a computer system which are accessible and convenient for individuals who possess a suitable mobile device.

The invention claimed is:

1. A computer voting system to receive votes from one or more mobile devices through a wireless personal area network to select content stored on the system, each mobile device comprising a mobile device name that is editable by a user to include a user-entered vote, the system comprising:
an input arrangement to receive a mobile device name from a mobile device;
a processor to analyze the mobile device name to determine whether a user-entered vote is included in the mobile device name, and if the user-entered vote is included in the mobile device name, to extract the user-entered vote from the mobile device name;
a storage apparatus to store content; and
an output arrangement to output content,
wherein the extracted user-entered vote relates to a selection of a content, and
wherein the processor is further to select the content from the storage apparatus to be output by the output arrangement based on the extracted user-entered vote.

2. A computer system as claimed in claim 1, wherein the output arrangement comprises a media player to output content.

3. A computer system as claimed in claim 1, wherein the system input arrangement is to receive a plurality of mobile device names over a defined time period and wherein the processor is to select content based on the user-entered votes determined from the plurality of mobile device names received first within the time period.

4. A computer system as claimed in claim 1, wherein the input arrangement is to receive a plurality of mobile device names over a defined time period and wherein the processor is to select content based on all of the user-entered votes determined from the mobile device names received within the time period.

5. A computer system as claimed in claim 1, wherein the content comprises music files.

6. A computer system as claimed in claim 5, comprising a voting system for music files, wherein the user-entered vote relates to a vote for one of the music files.

7. A computer system as claimed in claim 1, further comprising an acknowledgement apparatus to send, via the wireless personal area network, an acknowledgement to the mobile device from which the user-entered vote has been received.

8. A computer system as claimed in claim 1, wherein the input arrangement is further to receive a unique mobile device address that uniquely identifies the mobile device in the wireless personal area network.

9. A computer system as claimed in claim 8, wherein the processor is to execute a limited number of user-entered votes from a plurality of mobile devices in a given time period.

10. A computer system as claimed in claim 1, wherein the wireless personal area network is a Bluetooth network.

11. A computer system as claimed in claim 10, wherein the input arrangement is to receive the mobile device name from a Bluetooth transceiver.

12. A computer voting system to receive votes from one or more Bluetooth-enabled mobile devices through a wireless personal area network to select content stored on the system, each mobile device comprising a Bluetooth device name that is editable by a user to include a user-entered vote and a Bluetooth device address, the system comprising:
- a Bluetooth receiver to receive a Bluetooth mobile device name from a mobile device and a corresponding device address to uniquely identify the mobile device;
- a processor to analyze the Bluetooth mobile device name to determine whether a user-entered vote is included in the Bluetooth mobile device name, and if the user-entered vote is included in the Bluetooth mobile device name, to extract the user-entered vote from the Bluetooth mobile device name;
- a storage apparatus to store content;
- an output arrangement to output content; and
- an acknowledgement apparatus to send, via the wireless personal area network, an acknowledgement to the mobile device from which the user-entered vote has been received,
- wherein the extracted user-entered vote relates to a selection of a content, and
- wherein the processor is further to select the content to be output by the output arrangement based on the extracted user-entered vote.

13. A method to receive votes from one or more mobile devices through a wireless personal area network to select content stored on the system, each mobile device comprising a mobile device name that is editable by a user to include a user-entered vote, the method comprising:
- storing the content in a storage apparatus;
- receiving mobile device names from the one or more mobile devices;
- determining, by a processor, whether the mobile device names include user-entered votes, wherein the user-entered votes relate to selections of the content;
- if the mobile device names include user-entered votes, extracting, by the processor, the user-entered votes from the mobile device names;
- selecting the content from the storage apparatus based on the extracted user-entered votes; and
- outputting the selected content on an output arrangement.

14. The method of claim 13, further comprising:
- determining whether addresses of the mobile devices whose device names include the user-entered votes are stored in an address storage device; and
- if the addresses of the mobile devices whose device names include the user-entered votes are not stored in the address storage device, storing the addresses in the address storage device.

\* \* \* \* \*

UNITED STATES PATENT AND TRADEMARK OFFICE
CERTIFICATE OF CORRECTION

| | | |
|---|---|---|
| PATENT NO. | : 8,204,936 B2 | Page 1 of 1 |
| APPLICATION NO. | : 12/422264 | |
| DATED | : June 19, 2012 | |
| INVENTOR(S) | : Timothy Kindberg et al. | |

It is certified that error appears in the above-identified patent and that said Letters Patent is hereby corrected as shown below:

In column 10, line 38, in Claim 3, before "input" delete "system".

Signed and Sealed this
Eighteenth Day of December, 2012

David J. Kappos
*Director of the United States Patent and Trademark Office*